United States Patent [19]

Kuhara et al.

[11] Patent Number: 4,943,489
[45] Date of Patent: Jul. 24, 1990

[54] COMPOSITE PIPE HAVING EXCELLENT CORROSION RESISTANCE AND MECHANICAL PROPERTIES TO WITHSTAND HIGH TEMPERATURES AND HIGH PRESSURES

[75] Inventors: Akio Kuhara; Akira Yoshitake; Takeshi Torigoe; Shinji Amako, all of Hirakata, Japan

[73] Assignee: Kubota Ltd., Osaka, Japan

[21] Appl. No.: 355,584

[22] Filed: May 23, 1989

[51] Int. Cl.$^5$ .............................................. B32B 15/00
[52] U.S. Cl. .................................... 428/586; 428/679; 428/685; 428/682; 428/680; 428/683; 138/143; 138/DIG. 6
[58] Field of Search ............... 428/586, 679, 685, 682, 428/683; 138/DIG. 6, 143

[56] References Cited

U.S. PATENT DOCUMENTS

| | | | |
|---|---|---|---|
| 4,178,417 | 12/1979 | Oda et al. | 428/586 |
| 4,464,209 | 8/1984 | Taira et al. | 428/683 |
| 4,872,519 | 10/1989 | Kopecki | 138/DIG. 6 |

FOREIGN PATENT DOCUMENTS

| | | | |
|---|---|---|---|
| 0233437 | 8/1987 | European Pat. Off. | 428/586 |
| 2594732 | 8/1987 | France . | |

*Primary Examiner*—Deborah Yee
*Attorney, Agent, or Firm*—Armstrong, Nikaido, Marmelstein, Kubovcik & Murray

[57] ABSTRACT

Composite pipe adapted for use, for example, in line pipes for crude oil or natural gas producing oil wells and having excellent corrosion resistance and mechanical properties to withstand high temperatures and high pressures, the composite pipe having an outer layer made of a material comprising in % by weight 0.05 to 0.20% of C, up to 1.0% of Si, up to 2.0% of Mn, up to 1.0% of Cr, 0.2 to 2.0% of Ni, up to 1.0% of Mo, 0.05 to 0.15% of V, up to 0.1% of Al, and the balance inevitable impurities and Fe, the material being up to 0.45 in carbon equivalent expressed by:

$$\text{carbon equivalent (\%)} = C + \frac{Mn}{6} + \frac{Cr + Mo + V}{5} + \frac{Ni}{15},$$

an inner layer made of stainless steel, high alloy steel or like corrosion resistant alloy, and an intermediate layer substantially intermediate between the outer layer and the inner layer in composition and having a thickness of 10 to 100 μm, the intermediate layer providing a boundary between the outer and inner layers and being metallurgically joint to the outer layer and the inner layer integrally therewith.

7 Claims, 3 Drawing Sheets

10 μm

Outer Layer | Intermediate Layer (30 μm) | Inner Layer

10 μm

Outer Layer | Intermediate Layer (20 μm) | Inner Layer

Outer Layer | Intermediate Layer (45 μm) | Inner Layer

Outer Layer | Intermediate Layer (30 μm) | Inner Layer

COMPOSITE PIPE HAVING EXCELLENT CORROSION RESISTANCE AND MECHANICAL PROPERTIES TO WITHSTAND HIGH TEMPERATURES AND HIGH PRESSURES

FIELD OF INDUSTRIAL APPLICATION

The present invention relates to improvements in clad pipes for use as line pipes to be installed, for example, in oil wells in a sour environment with a high $H_2S$ content.

BACKGROUND OF THE INVENTION

Line pipes for use in crude oil or natural gas producing oil wells must have mechanical properties to withstand high temperatures and high pressures, and excellent corrosion resistance. With an increase in the depth of oil wells in recent years, such pipes are subjected to higher temperatures and higher pressures, while with sites of production shifted from the land to the sea, these pipes are inevitably used in oil wells containing chlorine ion, hydrogen sulfide and carbon dioxide. Thus, improved mechanical properties and higher corrosion resistance are required of such pipes.

Since pipes of single layer are unable to have both of these characteristics, pipes of two-layer structure have been proposed which comprise an outer layer of carbon steel or low alloy steel, and an inner layer of stainless steel, high alloy steel or like corrosion resistant alloy.

Pipes for the above use are elongated pipes of small diameter generally measuring about 100 to about 600 mm in outside diameter, about 4000 to 6000 mm in length, about 10 to about 60 mm in outer layer thickness and about 2 to 4 mm in inner layer thickness. Conventional two-layer pipes for use as line pipes in oil wells or the like are produced by preparing an inner-layer pipe and an outer-layer pipe first, fitting the two pipes together and subjecting the pipe assembly to a hydraulic press, hot rolling, hot extrusion or explosive pressure-bonding process.

These two-layer pipes have problems. Firstly, the pipes have increased eccentricity. Secondly, some of the pipes have insufficient bond strength because the outer layer and the inner layer are not fully in metal-to-metal intimate bonding contact with each other but are mechanically joined together locally. Moreover, since the composition of the material forming the pipe distinctly differs at the boundary between the outer layer and the inner layer, the pipe has reduced strength in its entirety. Further when the pipe is used in a sour environment, hydrogen sulfide penetrates into the mechanically joined portion during use, inducing at the joint.

If the two-layer pipe is produced in the form of a composite pipe by centrifugal casting, the outer layer and the inner layer can be metallurgically joined together with enhanced bond strength, whereas another problem will then arise. The material of the inner layer and the material of the outer layer diffuse into each other, impairing the mechanical strength of the outer layer and the corrosion resistance of the inner layer.

We have found that such an elongated pipe of small diameter can be produced by centrifugal casting in the form of a composite pipe having satisfactory bond strength without permitting diffusion of the materials of the outer and inner layers into each other when the pipe is so cast that an intermediate layer of a predetermined thickness is formed between the outer layer and the inner layer. The pipe can be produced as a metallugically integral pipe without permitting the materials of the outer and inner layers to mix with each other except at the intermediate layer, so that the outer layer exhibits the contemplated mechanical properties, with the inner layer retaining the specified corrosion resistance.

SUMMARY OF THE INVENTION

An object of the present invention is to provide a composite pipe which comprises an outer layer of low alloy steel, an inner layer of corrosion resistant alloy and an intermediate layer having a composition substantially intermediate between those of the outer and inner layers and a thickness of 10 to 100 micrometers, the intermediate layer being formed between and metallurgically joined to the outer layer and the inner layer integrally therewith.

More specifically, an object of the invention is to provide a composite pipe which has an outer layer made of a material comprising in % by weight 0.05 to 0.20% of C, up to 1.0% of Si, up to 2.0% of Mn, up to 1.0% of Cr, 0.2 to 2.0% of Ni, up to 1.0% of Mo, 0.05 to 0.15% of V, up to 0.1% of Al, and the balance inevitable impurities and Fe, the material being up to 0.45 in carbon equivalent expressed by:

$$\text{carbon equivalent (\%)} = C + \frac{Mn}{6} + \frac{Cr + Mo + V}{5} + \frac{Ni}{15}$$

so that the outer layer exhibits high mechanical strength at high temperatures and high pressures, an inner layer made of stainless steel, high alloy steel or like corrosion resistant alloy so as to exhibit high corrosion resistance, and an intermediate layer substantially intermediate between the outer layer and the inner layer in composition and having a thickness of 10 to 100 micrometers, the intermediate layer providing a boundary between the outer and inner layers and being metallurgically joined to the outer layer and the inner layer integrally therewith.

DETAILED DESCRIPTION OF THE INVENTION

Figure 1:
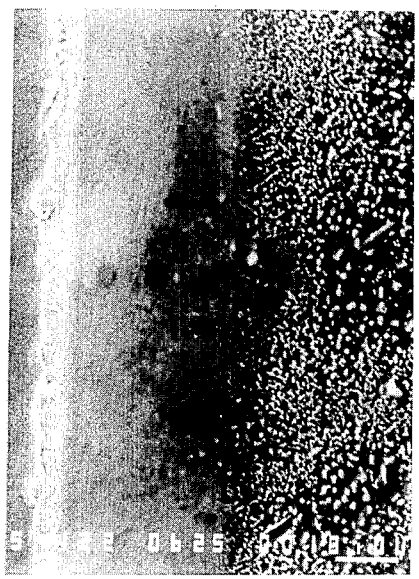
FIG. 1 is an electron micrograph showing the metal structure of a composite pipe of the invention as a first embodiment in the vicinity of an intermediate layer.

As stated above, the composite pipe of the present invention comprises an outer layer of low alloy steel and an inner layer of corrosion resistant alloy steel.

More specifically, the outerlayer is prepared from a material which comprises 0.05 to 0.20% of C, up to 1.0% of Si, up to 2.0% of Mn, up to 1.0% of Cr, 0.2 to 2.0% of Ni, up to 1.0% of Mo, 0.05 to 0.15% of V, up to 0.1% of Al, and the balance inevitable impurities and Fe, (All the proportions are expressed in % by weight, the same as hereinafter.) The material is up to 0.45 in carbon equivalent expressed by:

Carbon equivalent (%) =
$$C + \frac{Mn}{6} + \frac{Cr + Mo + V}{5} + \frac{Ni}{15}$$

The material is characterized in that it contains the specific components Ni and V for giving improved mechanical properties to the outer layer.

Ni affords improved impact resistance at low temperatures and enhanced strength at ordinary temperature. To ensure this effect, the Ni content should be 0.2 to 2.0%.

V serves to give improved hardening properties and finer crystal grains. To fully ensure this effect, the V content should be 0.05 to 0.15%.

The composite pipe of the present invention comprises an intermediate layer formed between the outer layer and the inner layer and having a specified composition and a predetermined thickness. The intermediate layer is formed by the material for the inner layer being mixed with the material of the outer layer when the former material is poured into the mold. The intermediate layer should be 10 to 100 micrometers to form a bond of sufficient strength between the outer layer and the inner layer and to prevent the materials of the outer and inner layers from mixing with each other. If less than 10 micrometers in thickness, the intermediate layer fails to afford satisfactory bond strength. When the thickness of the intermediate layer exceeds 100 micrometers in the case where the inner layer is about 2 to about 4 mm in thickness, the material of the outer layer penetrates into the inner layer to impair the corrosion resistance of the inner layer, with the result that the pipe obtained is not usable as a line pipe.

With the intermediate layer limited to the range of 10 to 100 micrometers in thickness, the desired composite pipe can be produced without permitting the materials of the outer and inner layers to mix with each other. In the preferred embodiments to be described later, the thickness of intermediate layers is about 20 to about 45 micrometers.

Further as will become apparent from these embodiments, the bond strength between the outer layer and the inner layer is such that the shearing stress is at least about 40 kgf/mm$^2$.

Further because the materials of the outer and inner layers are precluded from diffusing into each other, the outer layer has specified mechanical strength, and the inner layer possesses the desired corrosion resistance.

The intermediate layer metallurgically joining the outer layer and the inner layer together obviates the problem that hydrogen sulfide penetrates into the mechanically joined portion between the outer and inner layers to induce cracking at the joint.

EMBODIMENTS

The composite pipe of the present invention is produced by pouring the material for the outer layer in a molten state into a rotary mold first, pouring the material for the inner layer into the mold after the solidification of the outer layer to melt the surface of the solidified layer with the melt and form an intermediate layer with a molten mixture of the two materials, further continuously pouring the inner layer material, and solidifying the inner layer.

To form the intermediate layer with a thickness in the specified range, each of the outer and inner layer materials must be cast with proper timing. If the inner layer is cast before the outer layer has been solidified, no boundary layer of intermediate composition will be formed, permitting diffusion of the two materials into each other, whereas if the inner layer is cast a prolonged period of time after the solidification of the outer layer, the inner layer will not be metallurgically joined to the outer layer.

Four kinds of alloys described below and having high corrosion resistance are proposed for forming the inner layer. The composition of the intermediate layer is also given which is substantially intermediate between those of the outer layer and the inner layer.

Composite pipes were prepared by centrifugal casting using these four kinds of alloys and subjected to shearing and separation tests to determine the bond strength. Low alloy steel of the composition already stated was used for the outer layer.

First Embodiment

The inner layer was prepared from an alloy comprising at least 58% of Ni, 20 to 23% of Cr, up to 5.0% of Fe, 8 to 10% of Mo, 3.15 to 4.15% of Nb, up to 0.1% of C, up to 0.5% of Mn, up to 0.5% of Si, up to 0.4% of Al, up to 0.4% of Ti and inevitable impurities based on the combined amount which is 100%. The intermediate layer contained 0.03 to 0.07% of C, 0.1 to 0.5% of Si, 0.4 to 0.8% of Mn, 14.0 to 18.0% of Cr, 47.0 to 53.0% of Ni, 3.0 to 7.0% of Mo, 21.0 to 25.0% of Fe, 0.6 to 2.6% of Nb, 0.05 to 0.20% of Al and inevitable impurities based on the combined amount which is 100%.

Table 1 shows the alloy compositions of the layers of the composite pipe according to the present embodiment. The composition of the intermediate layer was determined approximately at the midportion of its thickness.

The composite pipe was 5600 mm in length, 170 mm in outside diameter, 134 mm in inside diameter, 15 mm in outer layer thickness, 3 mm in inner layer thickness and about 30 micrometers in intermediate layer thickness.

FIG. 1 is an electron micrograph showing the structure of the pipe in the vicinity of its intermediate layer.

Second Embodiment

The inner layer was prepared from an alloy comprising up to 0.030% of C, up to 1.0% of Si, up to 2.0% of Mn, 12.0 to 16.0% of Ni, 16.0 to 18.0% of Cr, 2.0 to 3.0% of Mo and the balance inevitable impurities and Fe based on the combined amount which is 100%. The intermediate layer contained 0.3 to 0.07% of C, 0.3 to 0.7% of Si, 0.5 to 1.5% of Mn, 6.0 to 12.0% of Cr, 4.0 to 11.0% of Ni, 0.9 1.5% of Mo, 75.0% to 85.0% of Fe, 0.01 to 0.05% of Al and inevitable impurities based on the combined amount which is 100%.

Table 2 shows the alloy compositions of the layers of the composite pipe according to the present embodiment. The composition of the intermediate layer was determined approximately at the midportion of its thickness.

The composite pipe was 5600 mm in length. 170 mm in outside diameter. 1344 mm in inside diameter. 15 mm in outer layer thickness, 3 mm in inner layer thickness and about 20 micrometers in intermediate layer thickness.

Figure 2:
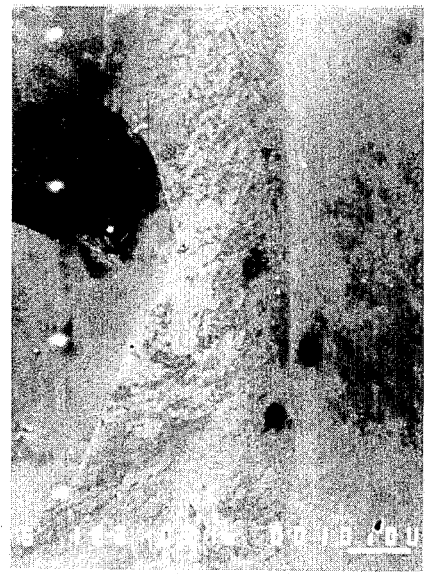
FIG. 2 is an electron micrograph showing the metal structure of a composite pipe of the invention as a second embodiment in the vicinity of an intermediate layer.

Fig. 2 is an electron micrograph showing the structure of the pipe in the vicinity of its intermediate layer.

Third Embodiment

The inner layer was prepared from an alloy comprising 38.0 to 46.0% of Ni, at least 22.0% of Fe, 19.5 to 23.5% of Cr, 2.5 to 3.5% of Mo, 1.5 to 3.0% of Cu, 0.6 to 1.2% of Ti, up to 0.05% of C, up to 1.0% of Mn, up to 0.5% of Si, up to 0.2% of Al and inevitable impurities based on the combined amount which is 100%. The intermediate layer contained 0.03 to 0.07% of C, 0.01 to 0.5% of Si, 0.4 to 0.8% of Mn, 12.0 to 18.0% of Cr, 29.0 to 35.0% of Ni, 1.5 to 2.5% of Mo, 41.0 to 48.0% of Fe, 0.03 to 0.06% of Al, 0.8 to 1.3% of Cu. 0.1 to 0.2% of Ti and inevitable impurities based on the combined amount which is 100%.

Table 3 shows the alloy compositions of the layers of the composite pipe according to the present embodiment. The composition of the intermediate layer was determined approximately at the midportion of its thickness.

The composite pipe was 5600 mm in length. 170 mm in outside diameter. 134 mm in inside diameter. 15 mm in outer layer thickness. 3 mm in inner layer thickness and about 45 micrometers in intermediate layer thickness.

Figure 3:
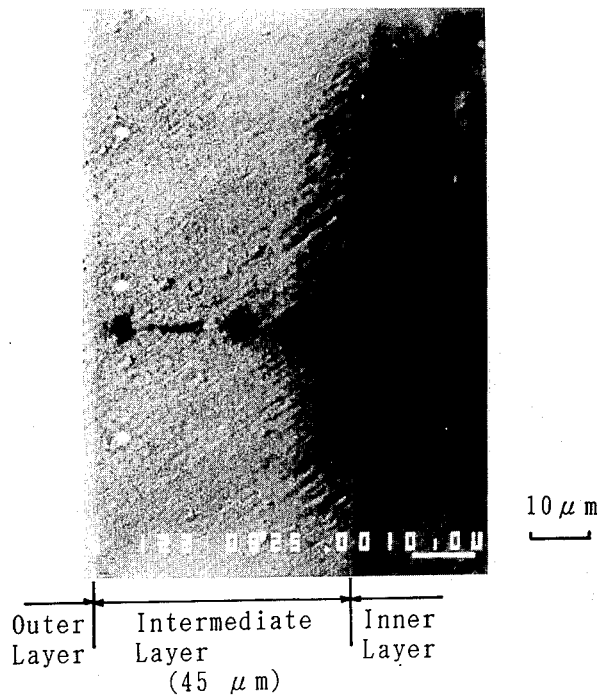
FIG. 3 is an electron micrograph showing the metal structure of a composite pipe of the invention as a third embodiment in the vicinity of an intermediate layer.

FIG. 3 is an electron micrograph showing the structure of the pipe in the vicinity of its intermediate layer.

Fourth Embodiment

The inner layer was prepared from an alloy comprising up to 0.030% C, up to 1.0% of Si, up to 2.0% of Mn, 19.0 to 21.0% of Cr, 24.0 to % 26.0% of Ni, 6.0 to 7.0% of Mo, 0.8 to 1.5% of Cu, 0.10 to 0.20% of N and the balance inevitable impurities and Fe based on the combined amount which is 100%. The intermediate layer contained 0.03 to 0.07% of C, 0.1 to 0.5% of Si, 0.4 to 0.8% of Mn, 13.0 to 17.0% of Cr, 13.0 to 17.0% of Ni, 1.5 to 4.5% of Mo, 0.08 to 0.13% of N, 0.4 to 0.7% of Cu, 60.0 to 70.0% of Fe and inevitable impurities based on the combined amount which is 100%.

Table 4 shows the alloy compositions of the layers of the composite pipe according to the present embodiment. The composition of the intermediate layer was determined approximately at the midportion of its thickness.

The composite pipe was 5600 mm in length. 170 mm in outside diameter, 134 mm in inside diameter. 15 mm in outer layer thickness, 3 mm in inner layer thickness and about 30 micrometers in intermediate layer thickness.

Figure 4:
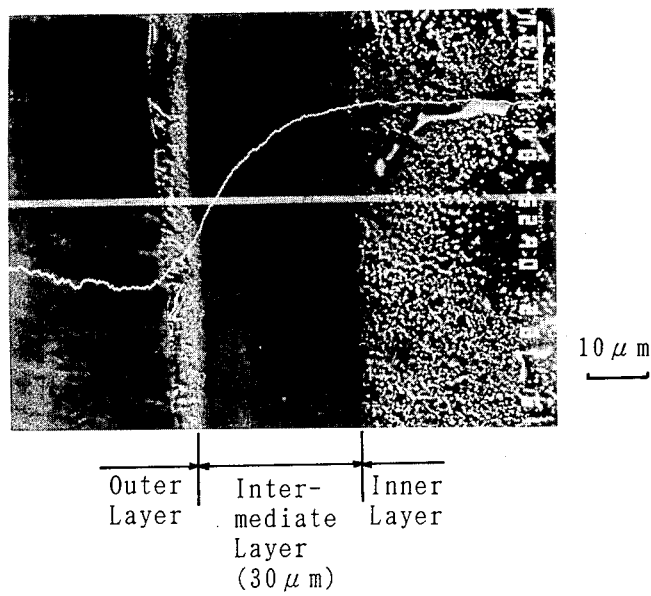
FIG. 4 is an electron micrograph showing the metal structure of a composite pipe of the invention as a fourth embodiment in the vicinity of an intermediate layer.

FIG. 4 is an electron micrograph showing the structure of the pipe in the vicinity of its intermediate layer.

TABLE 1

| | C | Si | Mn | Cr | Ni | Mo | Nb | Fe | Al | V | Ti | Carbon Equivalent |
|---|---|---|---|---|---|---|---|---|---|---|---|---|
| Outer Layer | 0.12 | 0.28 | 0.98 | 0.09 | 0.51 | 0.20 | — | Bal. | 0.05 | 0.08 | — | 0.39 |
| Inner Layer | 0.02 | 0.34 | 0.30 | 22.60 | Bal. | 9.11 | 3.58 | 0.20 | — | 0.17 | — | |
| Intermediate Layer | 0.04 | 0.30 | 0.56 | 16.70 | 50.04 | 5.64 | 1.57 | 23.14 | 0.08 | — | — | — |

Remarks:
Outer Layer: The balance is Fe, but includes ordinarily inevitable impurities such as P, S, or the like.
Inner Layer: The balance is Ni, but includes ordinarily inevitable impurities such as P, S, or the like.
Intermediate Layer: This layer includes 1.93% of ordinary impurities.

TABLE 2

| | C | Si | Mn | Cr | Ni | Mo | Fe | Al | V | Carbon Equivalent |
|---|---|---|---|---|---|---|---|---|---|---|
| Outer Layer | 0.12 | 0.35 | 0.99 | 0.20 | 0.49 | 0.20 | Bal. | 0.02 | 0.09 | 0.42 |
| Inner Layer | 0.02 | 0.61 | 1.10 | 17.67 | 15.48 | 2.68 | Bal. | — | — | — |
| Intermediate Layer | 0.04 | 0.44 | 0.84 | 9.49 | 7.09 | 1.27 | Bal. | 0.01 | — | — |

Remarks:
Outer Layer: The balance is Fe, but includes ordinarily inevitable impurities such as P, S, or the like.
Inner Layer: The balance is Fe, but includes ordinarily inevitable impurities such as P, S, or the like.
Intermediate Layer: The balance is Fe, but includes ordinarily inevitable impurities such as P, S, or the like.

TABLE 3

| | C | Si | Mn | Cr | Ni | Mo | Al | V | Cu | Ti | Fe | Carbon Equivalent |
|---|---|---|---|---|---|---|---|---|---|---|---|---|
| Outer Layer | 0.11 | 0.30 | 0.99 | 0.15 | 0.43 | 0.22 | 0.02 | 0.08 | — | — | Bal. | 0.39 |
| Inner Layer | 0.028 | 0.26 | 0.33 | 20.95 | 40.84 | 3.33 | 0.08 | — | 150 | 0.60 | 31.83 | — |
| Intermediate | 0.04 | 0.21 | 0.63 | 14.85 | 32.12 | 2.02 | 0.03 | — | 1.05 | 0.14 | 47.62 | — |

TABLE 3-continued (% by weight)

| | C | Si | Mn | Cr | Ni | Mo | Al | V | Cu | Ti | Fe | Carbon Equivalent |
|---|---|---|---|---|---|---|---|---|---|---|---|---|
| Layer | | | | | | | | | | | | |

Remarks:
Outer Layer: The balance is Fe, but includes ordinarily inevitable impurities such as P, S, or the like.
Inner Layer: This layer includes 0.252% of ordinarily impurities.
Intermediate Layer: This layer includes 1.29% of ordinary impurities.

TABLE 4

(% by weight)

| | C | Si | Mn | Cr | Ni | Mo | Al | V | Cu | N | Fe | Carbon Equivalent |
|---|---|---|---|---|---|---|---|---|---|---|---|---|
| Outer Layer | 0.11 | 0.31 | 1.01 | 0.08 | 0.50 | 0.19 | 0.04 | 0.08 | — | — | Bal. | 0.38 |
| Inner Layer | 0.02 | 0.41 | 0.63 | 20.51 | 25.48 | 6.61 | — | — | 0.98 | 0.17 | Bal. | — |
| Intermediate Layer | 0.04 | 0.34 | 0.72 | 15.12 | 14.18 | 2.98 | — | — | 0.49 | 0.09 | Bal. | — |

Remarks:
Outer Layer: The balance is Fe, but includes ordinarily inevitable impurities such as P, S, or the like.
Inner Layer: The balance is Fe, but includes ordinarily inevitable impurities such as P, S, or the like.
Intermediate Layer: The balance is Fe, but includes ordinarily inevitable impurities such as P, S, or the like.

The pipes of the first to fourth embodiments were subjected to the shearing test prescribed in ASTM A 264 and checked for shearing stress with the following results.

| First embodiment | 46 kgf/mm² |
| Second embodiment | 41 kgf/mm² |
| Third embodiment | 42 kgf/mm² |
| Fourth embodiment | 40 kgf/mm² |

Figure 5:
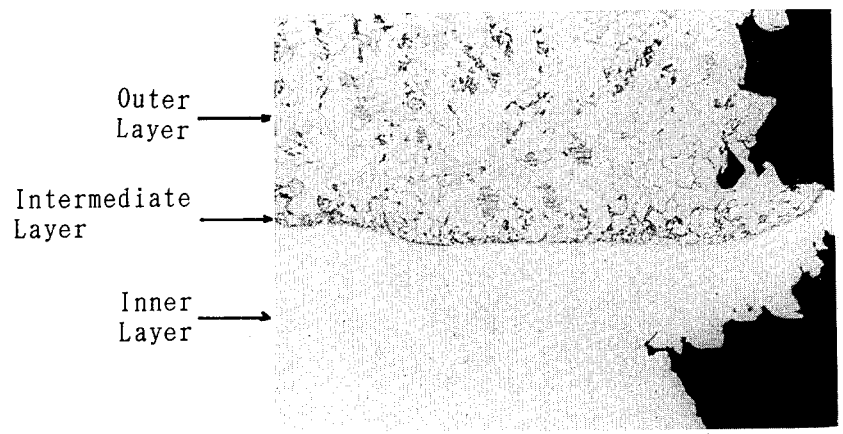
FIG. 5 is an optical micrograph ($\times 100$) showing the metal structure of the composite pipe of the first embodiment as subjected to impact for a separation test.

The pipe of the first embodiment was tested for separation by applying an impact force of 30 kg.m thereto, but no separation occurred between the inner, intermediate and outer layers. FIG. 5 shows the metal structure of the pipe subjected to the separation test.

The composite pipe of the present invention has an intermediate layer having a predetermined thickness and formed by a mixture of the materials for outer and inner layers. The outer layer and the inner layers are metallurgically joined together by the intermediate layer with sufficient strength, with the materials of the outer and inner layers prevented from mixing with each other. This construction therefore enables the outer layer to exhibit the contemplated mechanical properties, with the inner layer given the desired corrosion resistance.

With the outer layer and the inner layer thus metallurgically joined together by the intermediate layer, the composite pipe of the invention has no mechanically joined portion and is accordingly free of the likelihood that hydrogen sulfide will penetrate into the joint between the outer and inner layers during use to induce cracking at the joint.

The composite pipe of the present invention is suited for use in line piping systems for crude oil and natural gas oil wells.

What is claimed is:

1. A composite pipe having excellent corrosion resistance and mechanical properties to withstand high temperatures and high pressures, the composite pipe being characterized in that the pipe comprises an outer layer of a material consisting essentially of % by weight 0.05 to 0.20% of C, up to 1.0% of Si, up to 2.0% of Mn, up to 1.0% of Cr, 0.2 to 2.0% of Ni, up to 1.0% of Mo, 0.05 to 0.15% of V, up to 0.1% of Al, and the balance inevitable impurities and Fe, the material being up to 0.45% in carbon equivalent expressed by:

$$\text{carbon equivalent (\%)} = C + \frac{Mn}{6} + \frac{Cr + Mo + V}{5} + \frac{Ni}{15},$$

an inner layer made of stainless steel, high alloy steel or like corrosion resistant alloy, and an intermediate layer substantially intermediate between the outer layer and the inner layer in composition and having a thickness of 10 to 100 μm, the intermediate layer providing a boundary between the outer and inner layers and being metallurgically joined to the outer layer and the inner layer integrally therewith.

2. The composite pipe as defined in claim 1 wherein the inner layer consists essentially of at least 58% of Ni, 20 to 23% of Cr, up to 5.0% of Fe, 8 to 10% of Mo, 3.15 to 4.15% of Nb, up to 0.1% of C, up to 0.5% of Mn, up to 0.5% of Si, up to 0.4% of Al, up to 0.4% of Ti and inevitable impurities based on the combined amount which is 100%, and the intermediate layer consists essentially of 0.03 to 0.07% of C, 0.1 to 0.5 of Si, 0.4 to 0.8% of Mn, 14.0 to 18.0% of Cr, 47.0 to 53.0% of Ni, 3.0 to 7.0% of Mo, 21.0% to 25.0% of Fe, 0.6 to 2.6% of Nb, 0.05 to 0.20% of Al and inevitable impurities based on the combined amount which is 100%.

3. The composite pipe as defined in claim 1 wherein the inner layer consists essentially of up to 0.030% of C, up to 1.0% of Si, up to 2.0% of Mn, 12.0 to 16.0% of Ni, 16.0 to 18.0% of Cr, 2.0 to 3.0% of Mo and the balance inevitable impurities and Fe based on the combined amount which is 100%, and the intermediate layer consists essentially of 0.03 to 0.07% of C, 0.3 to 0.7% of Si, 0.5% to 1.5% of Mn, 6.0 to 12.0% of Cr, 4.0 to 11.0% of Ni, 0.9 to 1.5% of Mo, 75.0 to 85.0% of Fe, 0.01 to 0.05 of Al and inevitable impurities based on the combined amount which is 100%.

4. The composite pipe as defined in claim 1 wherein the inner layer consists essentially of 38.0 to 46.0% of Ni, at least 22.0% of Fe, 19.5% to 23.5% of Cr, 2.5 3.5% of Mo, 1.5 to 3.0% of Cu, 0.6 to 1.2% of Ti, up to 0.05% of C, up to 1.0% of Mn, up to 0.5% of Si, up to 0.2% of Al and inevitable impurities based on the combined amount which is 100%, and the intermediate layer consists essentially of 0.03 to 0.07% of C, 0.1 to 0.5% of Si, 0.4 to 0.8% of Mn, 12.0 to 18.0% of Cr, 29.0 to 35.0% of Ni, 1.5 to 2.5% of Mo, 41.0 to 48.0% of Fe, 0.03 to 0.06% of Al, 0.8 to 1.3% of Cu, 1.0 to 0.2% of Ti and inevitable impurities based on the combined amount which is 100%.

5. The composite pipe as defined in claim 1 wherein the inner layer consists essentially of up to 0.030% of C, up to 1.0% of Si, up to 2.0% of Mn, 19.0 to 21.0% of Cr, 24.0 to 26.0% of Ni, 6.0 to 7.0% of Mo, 0.8 to 1.5% of Cu, 0.10 to 0.20% of N and the balance inevitable impurities and Fe based on the combined amount which is 100%, and the intermediate layer consists essentially of 0.03 to 0.07% of C, 0.1 to 0.5% of Si, 0.4 to 0.8% of Mn, 13.0 to 17.0% of Cr, 13.0 to 17.0% of Ni, 1.5 to 4.5% of Mo, 0.08 to 0.13% of N, 0.4 to 0.7% of Cu, 60.0 to 70.0% of Fe and inevitable impurities based on the combined amount which is 100%.

6. The composite pipe as defined in claim 1 wherein the thickness of the intermediate layer is 20 to 45% $\mu$m.

7. The composite pipe as defined in claim 1 wherein the bond strength between the outer layer and the inner layer is at least 40 kgf/mm$^2$ with respect to the shearing stress.

* * * * *